(12) United States Patent
Murakami (10) Patent No.: US 9,350,209 B2
(45) Date of Patent: May 24, 2016

(54) STATOR OF ELECTRIC MOTOR PROVIDED WITH COIL FASTENING PART, ELECTRIC MOTOR, AND FASTENING METHOD OF UNIT COIL (71) Applicant: FANUC CORPORATION, Yamanashi (JP)

(72) Inventor: Yoshinori Murakami, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 30 days.

(21) Appl. No.: 14/537,063

(22) Filed: Nov. 10, 2014

(65) Prior Publication Data
US 2015/0130320 A1 May 14, 2015

(30) Foreign Application Priority Data
Nov. 11, 2013 (JP) .................. 2013-233438

(51) Int. Cl.
H02K 3/52 (2006.01)
H02K 15/06 (2006.01)

(52) U.S. Cl.
CPC ........... *H02K 3/522* (2013.01); *Y10T 29/49009* (2015.01)

(58) Field of Classification Search
None
See application file for complete search history.

(56) References Cited

U.S. PATENT DOCUMENTS 5,285,563 A * 2/1994 Nove ...................... H02K 3/522
166/402
6,137,202 A * 10/2000 Holmes .................... H01F 5/06
29/598
2006/0238059 A1 * 10/2006 Komatsu .................. H02K 1/14
310/162
2010/0188181 A1 * 7/2010 Urano ..................... H02K 3/522
336/198
2010/0207466 A1 * 8/2010 Endo ....................... H02K 3/522
310/71

FOREIGN PATENT DOCUMENTS

| JP | S29006620 Y1 | 6/1929 |
| JP | 2001268834 A | 9/2001 |
| JP | 2008259367 A | 10/2008 |
| JP | 2008283730 A | * 11/2008 |
| JP | 2010246269 A | 10/2010 |
| JP | 2011135640 A | 7/2011 |
| JP | 2012060747 A | 3/2012 |

(Continued)

OTHER PUBLICATIONS

English Machine Translation for Abstract of Japanese Publication No. 2013132108, published Jul. 4, 2013, 1 page.

(Continued)

*Primary Examiner* — Tran Nguyen
(74) *Attorney, Agent, or Firm* — Fredrikson & Byron, P.A.

(57) ABSTRACT

A coil fastening part in a stator of the present invention can be turned about its axis of rotation in a gap between an end face of a tooth and an inner circumferential surface of a unit coil and has a noncircular shape cross-section vertical to its axis of rotation. The noncircular shape cross-section of the coil fastening part has a first dimension which is represented by a first line segment which intersects its axis of rotation and a second dimension which is represented by a second line segment which intersects its axis of rotation, is different from the first line segment, and is larger than the first dimension. The coil fastening part is arranged in the gap in a state where the second line segment is aligned with the height direction of the gap and pushes against both the end face and the inner circumferential surface to thereby fasten the unit coil to a tooth.

7 Claims, 9 Drawing Sheets (56) References Cited

FOREIGN PATENT DOCUMENTS

| JP | 2013031252 A | 2/2013 |
| JP | 2013132108 A | 7/2013 |

OTHER PUBLICATIONS

English Machine Translation for Abstract of Japanese Publication No. 2012060747, published Mar. 22, 2012, 1 page.
English Machine Translation for Abstract of Japanese Publication No. 2011135640, published Jul. 7, 2011, 1 page.
English Machine Translation for Abstract of Japanese Publication No. 2008259367, published Oct. 23, 2008, 1 page.
English Machine Translation for Abstract of Japanese Publication No. 2001268834, published Sep. 28, 2001, 1 page.
English Abstract for Japanese Publication No. 2013-031252, published Feb. 7, 2013, 1 pg.
English Abstract for Japanese Publication No. 2010-246269, published Oct. 28, 2010, 1 pg.

* cited by examiner

STATOR OF ELECTRIC MOTOR PROVIDED WITH COIL FASTENING PART, ELECTRIC MOTOR, AND FASTENING METHOD OF UNIT COIL

BACKGROUND OF THE INVENTION

1. Field of the Invention

The present invention relates to a stator of an electric motor which is provided with a coil fastening part which fastens a unit coil which is arranged at a tooth of a core, an electric motor, and a fastening method which fastens a unit coil.

2. Description of the Related Art

In an electric motor which is provided with a unit coil, when the unit coil is attached to a tooth of a laminated core, a fine gap which is surrounded by the inner surface of the unit coil and the outer surface of the tooth is formed on either side of the tooth in the lamination direction of the laminated core. This gap can become a cause of detachment of the unit coil from the tooth after attachment of the unit coil, so a separate fastening step for fastening the attached unit coil to the tooth is considered necessary. In the conventional fastening step, various techniques were used to fasten the unit coil to the tooth.

For example, in the art which is described in JP-A-2013-031252, a heat foaming member was inserted in the clearance between the unit coil which was attached to the tooth of the stator and the heat foaming member was made to expand by heat so as to fasten the unit coil to the stator. Further, in the art which is described in JP-A-2010-246269, an insulator which has tabs which engage with the end face of the unit coil is attached to the tooth of the stator so as to fasten the unit coil to the stator. However, in the art which is described in JP-A-2013-031252, it is necessary to heat the heat foaming member, so the workability when fastening the unit coil falls. Further, in the art which is described in JP-A-2010-246269, it is necessary to prepare a complicatedly shaped insulator as a fastening part of the unit coil and necessary to additionally work the laminated core.

A stator of an electric motor which can improve the workability when fastening the unit coil to the tooth is sought.

SUMMARY OF THE INVENTION

According to a first aspect of the present invention, there is provided a stator of an electric motor which is provided with a tooth, a unit coil which is attached to the tooth so as to surround an outer circumferential surface of the tooth, and a coil fastening part which is arranged in a gap between an end face at the outer circumferential surface of the tooth and an inner circumferential surface of the unit coil, wherein the coil fastening part can be turned inside the gap about its axis of rotation and has a noncircular shape cross-section which is vertical to its axis of rotation, the coil fastening part has a cross-section with a first dimension which is represented by a first line segment which intersects its axis of rotation and a second dimension which is represented by a second line segment which intersects its axis of rotation and is different from the first line segment and which is larger than the first dimension, the coil fastening part can be turned about its axis of rotation so as to move between a first position at which the first line segment is aligned with a height direction of the gap vertical to an end face of a tooth and a second position at which the second line segment is aligned with a height direction of the gap, and the coil fastening part pushes against the end face of the tooth and the inner circumferential surface of the unit coil at the second position whereby the unit coil is fastened to the tooth.

According to a second aspect of the present invention, there is provided a stator of an electric motor of the first aspect of the present invention wherein the coil fastening part utilizes an elastic restoring force so as to push against the end face of the tooth and the inner circumferential surface of the unit coil.

According to a third aspect of the present invention, there is provided a stator of an electric motor of the first or second aspect of the present invention wherein the coil fastening part further has a recessed cutaway part which is formed to extend in parallel with its axis of rotation.

According to a fourth aspect of the present invention, there is provided a stator of an electric motor of the third aspect of the present invention wherein the recessed cutaway part is formed at a contact surface of the coil fastening part with the end face of the tooth or with an inner circumferential surface of the unit coil.

According to a fifth aspect of the present invention, there is provided a stator of an electric motor of any of the first to fourth aspects of the present invention wherein the stator is further provided with a cable which supplies power to the unit coil, a cable support part which extends along the outer circumferential surface of the unit coil and supports the cable is connected to the coil fastening part, and a space which holds the cable is formed between the cable support part and the outer circumferential surface of the unit coil.

According to a sixth aspect of the present invention, there is provided an electric motor which is provided with a stator according to any one of the first to fifth aspects of the present invention.

According to a seventh aspect of the present invention, there is provided a fastening method which fastens a unit coil in a stator of an electric motor, wherein the stator is provided with a tooth and a unit coil which is attached to the tooth so as to surround an outer circumferential surface of the tooth, a gap is formed between an end face at the outer circumferential surface of the tooth and an inner circumferential surface of the unit coil, the fastening method includes preparing a coil fastening part which can be turned inside the gap about its axis of rotation and has a noncircular shape cross-section which is vertical to its axis of rotation, the coil fastening part has a cross-section with a first dimension which is represented by a first line segment which intersects its axis of rotation and a second dimension which is represented by a second line segment which intersects its axis of rotation and is different from the first line segment and which is larger than the first dimension, the fastening method further includes inserting the coil fastening part in the gap so that the first line segment is aligned with a height direction of the gap vertical to the end face, and then turning the coil fastening part about its axis of rotation (R) so that the second line segment is aligned with a height direction of the gap, and the coil fastening part which is turned about its axis of rotation pushes against both the end face of the tooth and the inner circumferential surface of the unit coil whereby the unit coil is fastened to the tooth.

These and other objects, features, and advantages of the present invention will become clearer with reference to the description of the illustrative embodiments of the present invention which are shown in the attached drawings.

DETAILED DESCRIPTION OF THE INVENTION

Below, embodiments of the present invention will be explained in detail with reference to the drawings. Note that, the following description does not limit the technical scope of the invention described in the claims or the meanings of the terms etc.

Figure 1:
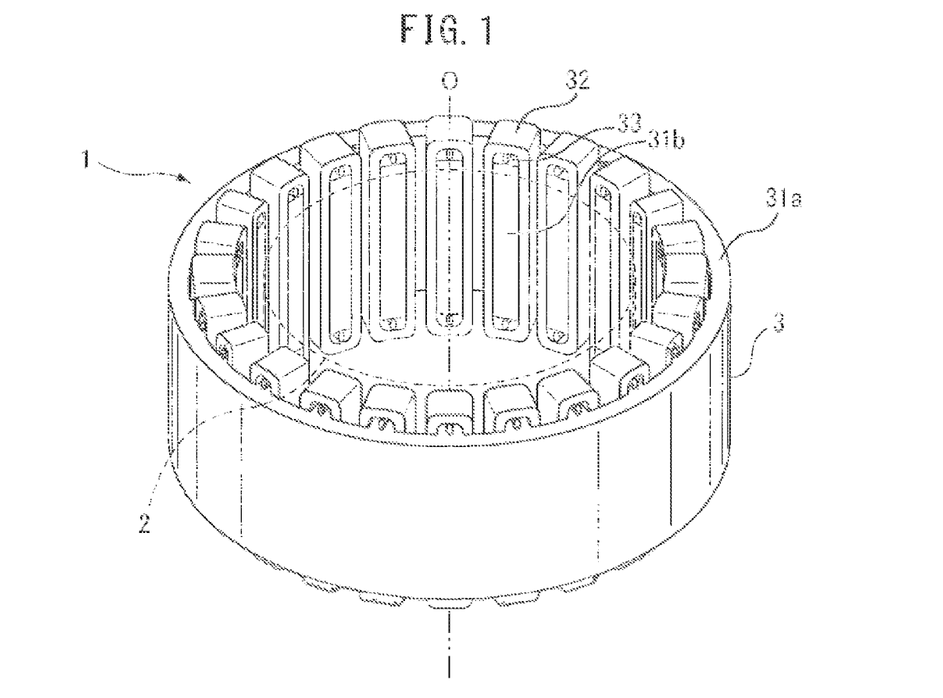
FIG. 1 is a perspective view which shows an electric motor which is provided with a stator of a first embodiment of the present invention.

First, referring to FIG. 1 to FIG. 8, an electric motor which is provided with a stator of a first embodiment of the present invention will be explained. The electric motor which is provided with the stator of the present embodiment is an electric motor which generates drive force by cooperation of a mover and stator. FIG. 1 is a perspective view of an electric motor 1 which is provided with an illustrative stator 3 of the present embodiment. As shown in FIG. 1, the electric motor 1 is provided with a mover 2 which can move rotating about a predetermined axis of rotation O and a ring-shaped stator 3 which is arranged so as to surround the mover 2.

Figure 2:
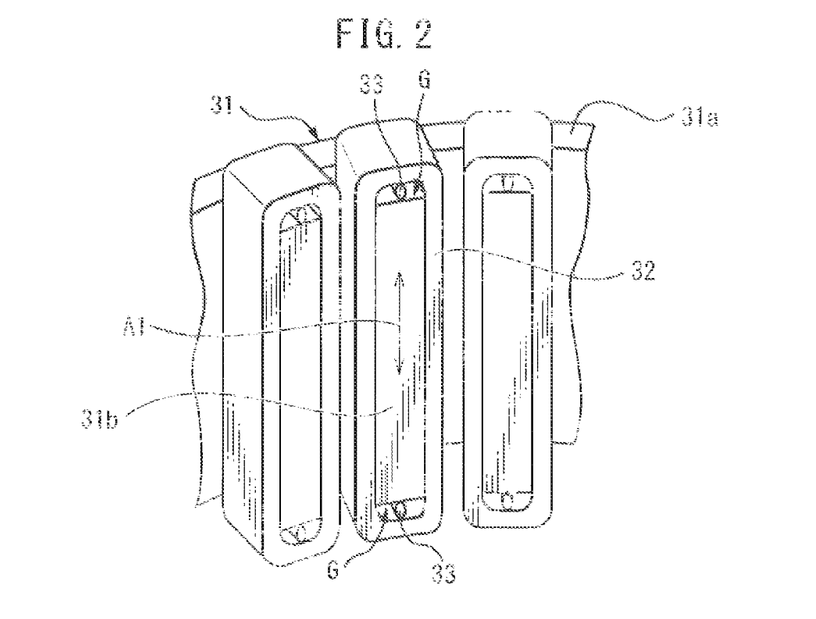
FIG. 2 is a perspective view which shows enlarged a part of the stator in the electric motor of FIG. 1.

FIG. 2 is a perspective view which shows enlarged a part of the stator 3 which is shown in FIG. 1. As will be understood from FIG. 1 and FIG. 2, the stator 3 is provided with a laminated core 31 which is formed by laminating electromagnetic steel sheets. The laminated core 31 has a ring-shaped yoke 31a which extends in a direction of movement of the mover 2, that is, along the rotation direction about an axis of rotation O, and a plurality of teeth 31b which stick out from the yoke 31a toward the mover 2. The stator 3 is further provided with a plurality of unit coils 32 which are attached to the teeth 31b so as to surround the outer circumferences of the teeth 31b of the laminated core 31. The stator 3 is further provided with electrical cables which are electrically connected to the unit coils 32 and supply power to the unit coils 32 (see FIG. 15 and FIG. 16).

In the present embodiment, if the unit coils 32 are attached to the teeth 31b of the laminated core 31, gaps G are formed between the unit coils 32 and the teeth 31b. In the example of FIG. 2, one gap G each is formed between each end face of the tooth 31b in the direction of extension and the inner circumferential surface of the unit coil 32. Note that, the "direction of extension of the teeth 31b" is the direction vertical to both the direction of extension of the yoke 31a and direction of projection of the teeth 31b and is shown by the arrow A1 of FIG. 2. In these gaps G, coil fastening parts 33 which have the functions of fastening the unit coils 32 to the teeth 31b are inserted. Due to the coil fastening parts 33, the unit coils 32 which are attached to the teeth 31b are prevented from detaching from the teeth 31b.

Figure 3:
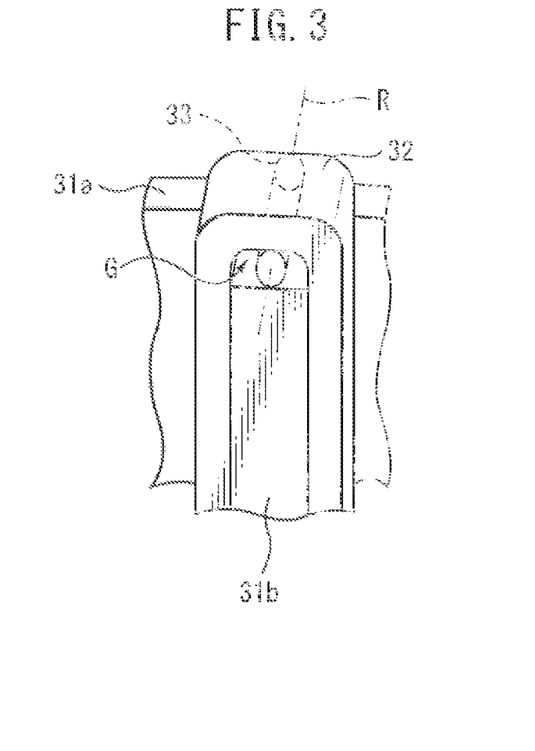
FIG. 3 is a perspective view which shows enlarged the vicinity of a gap in the stator of FIG. 2.

FIG. 3 is a perspective view which shows enlarged the vicinity of a gap G in the stator 3 of FIG. 2. The coil fastening part 33 in the stator 3 of the present embodiment can be turned inside the gap G about its axis of rotation R and has a noncircular shape cross-sectional shape in the cross-section vertical to its axis of rotation R. Here, the "noncircular shape cross-sectional shape" means a cross-sectional shape which is not a true circle. The coil fastening part 33 according to the example of FIG. 3 is a columnar member which extends along its axis of rotation R and has an oval cross-sectional shape in the cross-section vertical to its axis of rotation R. The cross-sectional shape of the coil fastening part 33 in the stator 3 of the present embodiment will be explained in further detail below.

Figure 4:
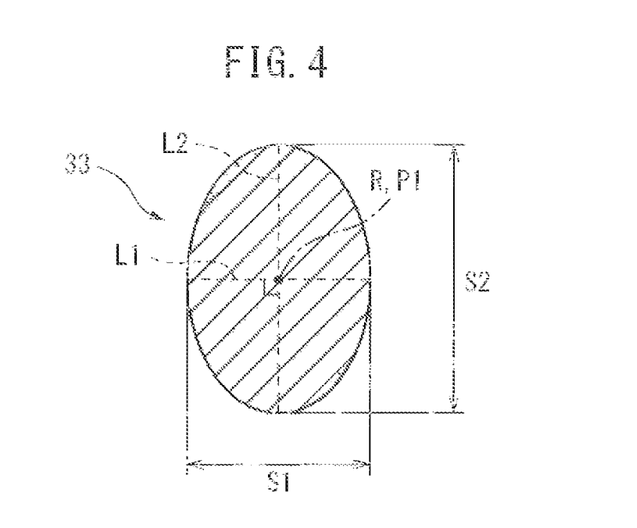
FIG. 4 is a cross-sectional view of a coil fastening part as seen along a plane vertical to an axis of rotation of a coil fastening part of FIG. 3.

FIG. 4 is a cross-sectional view of a coil fastening part 33 as seen along a plane vertical to the axis of rotation R of the coil fastening part 33 of FIG. 3. As shown in FIG. 4, the cross-section vertical to the axis of rotation R of the coil fastening part 33 has a first dimension S1 which is represented by a first line segment L1 and a second dimension S2 which is represented by a second line segment L2 which is different from the first line segment L1 and is larger than the first dimension S1 (S2>S1). Here, the first and second line segments L1 and L2 are both virtual line segments which connect two points on the contour line of the cross-section vertical to its axis of rotation R so as to intersect its axis of rotation R. The first line segment L1 is shorter than the second line segment L2. When the coil fastening part 33 has a cross-section of an oval shape such as shown in FIG. 4, for example, the axial line which passes through the center point P1 of the oval can be specified as its axis of rotation R. In this case, the minor axis and major axis of the oval can be specified as the first and second line segments L1 and L2. Further, the short axis and long axis lengths of the oval can be specified as the first and second dimensions S1 and S2.

Figure 5:
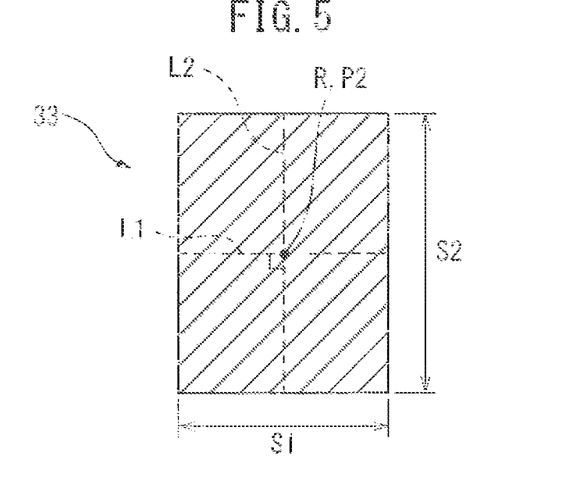
FIG. 5 is a cross-sectional view of a coil fastening part which has another shape.
Figure 6:
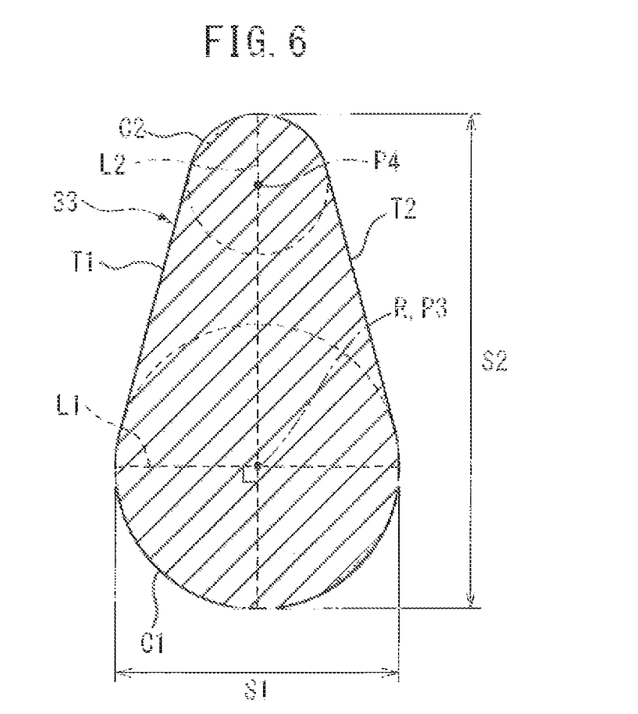
FIG. 6 is a cross-sectional view of a coil fastening part which has still another shape.

FIG. 5 and FIG. 6 are cross-sectional views similar to FIG. 4 which show cross-sections of coil fastening parts 33 which have other shapes. FIG. 5 shows a coil fastening part 33 which has a rectangular shape cross-section. When the coil fastening part 33 has a rectangular shape cross-section such as in FIG. 5, for example, the axial line which passes through the center point P2 of the rectangular shape can be specified as its axis of rotation R. In this case, the line segment which is parallel to the short sides of the rectangular shape and which passes through the center point P2 of the rectangular shape is specified as the first line segment L1, while the line segment which is parallel to the long sides of the rectangular shape and which passes through the center point P2 of the rectangular shape can be specified as the second line segment L2. Further, a short side length of the rectangular shape can be specified as the first dimension S1, while a long side length of the rectangular shape can be specified as the second dimension.

FIG. 6 shows a coil fastening part 33 which has a cross-section of a tangential cam shape. Here, a "tangential cam shape" means a shape which is comprised of a plurality of arcs and common tangents of those arcs. The tangential cam shape which is shown in FIG. 6 is comprised of two arcs C1 and C2 of different sizes and common tangents T1 and T2 of these arcs C1 and C2. When the coil fastening part 33 has a cross-section of a tangential cam shape such as in FIG. 6, for example, the axial line which passes through the center point P3 of the large size arc C1 can be specified as its axis of rotation R. In this case, the line segment which perpendicularly intersects the line segment which passes through the both center points P3 and P4 of the two arcs C1 and C2, and passes through the center point P3 of the large size arc C1 can be specified as the first line segment L1, while the line segment which passes through the both center points P3 and P4 of the two arcs C1 and C2 can be specified as the second line segment L2. Further, the dimension along the direction vertical to the direction of arrangement of the two arcs C1 and C2 can be specified as the first dimension S1, while the dimension along the direction of arrangement of the two arcs C1 and C2 can be specified as the second dimension S2. The coil fastening part 33 in the stator 3 of the present embodiment may have any cross-sectional shape which has the above-mentioned first and second dimensions S1, S2 (S1<S2) in addition to the cross-sectional shapes which are shown in FIG. 4 to FIG. 6.

Figure 7:
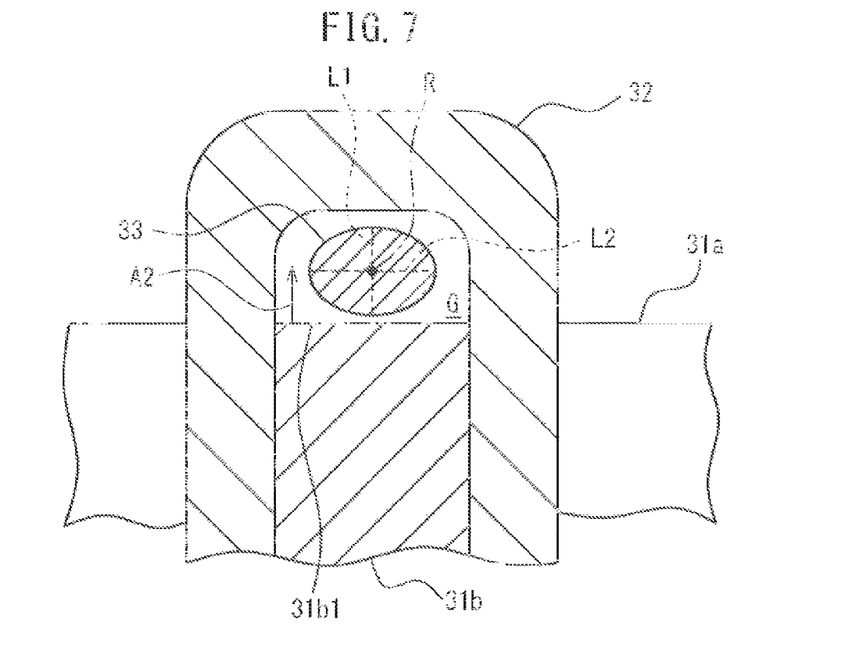
FIG. 7 is a cross-sectional view which shows the vicinity of a coil fastening part in a stator in a state before a unit coil is fastened.
Figure 8:
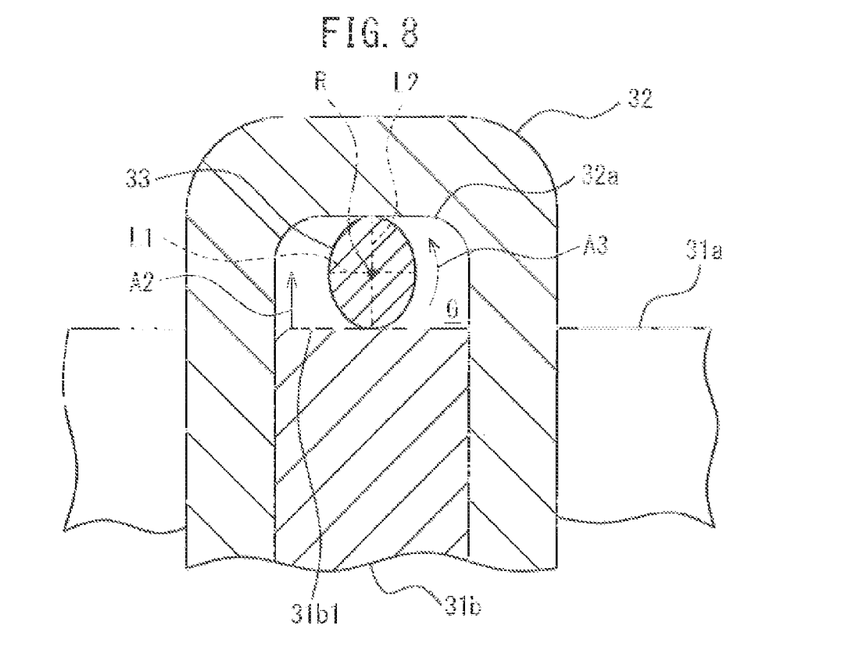
FIG. 8 is a cross-sectional view which shows the vicinity of a coil fastening part in a stator in a state after a unit coil is fastened.

FIG. 7 and FIG. 8 are cross-sectional views which show the vicinity of a coil fastening part 33 as seen along a plane vertical to the direction of projection of a tooth 31b at the stator 3 of FIG. 3. FIG. 7 shows the state before the unit coil 32 is fastened to a tooth 31b by a coil fastening part 33. As shown in FIG. 7, the coil fastening part 33 is inserted into the gap G so that the above-mentioned first line segment L1 is aligned with the height direction of the gap G. Here, the height direction of the gap G means a direction vertical to the end face 31b1 of the tooth 31b and is shown by the arrow A2 of FIG. 7. More specifically, in the example of FIG. 7, the coil fastening part 33 is inserted in the gap G so that the first line segment L1 becomes substantially parallel to the height direction of the gap G. Note that, when the coil fastening part 33 is inserted in the gap G, the axis of rotation R of the coil fastening part 33 can be made substantially vertical to the height direction of the gap G (that is, can be made substantially parallel to the end face 31b1 of the tooth 31b). In the example of FIG. 7, the axis of rotation R of the coil fastening part 33 is made vertical to both the height direction of the gap G (direction of arrow A2) and width direction (left-right direction of FIG. 7).

FIG. 8 shows the state after a coil fastening part 33 fastens a unit coil 32 to a tooth 31b. As will be understood from a comparison of FIG. 7 and FIG. 8, the coil fastening part 33 which is inserted into the gap G is then turned inside the gap G so that the above-mentioned second line segment L2 is aligned with the height direction of the gap G (direction of arrow A2). More specifically, in the example of FIG. 8, the coil fastening part 33 is turned in the gap G so that the second line segment L2 is substantially parallel with the height direction of the gap G. The rotation direction at this time is shown by the arrow A3. If the coil fastening part 33 is turned about its axis of rotation R in this way, the coil fastening part 33 contacts both the end face 31b1 of the tooth 31b and the inner circumferential surface 32a of the unit coil 32. As a result, the coil fastening part 33 pushes against both the tooth 31b and unit coil 32, so the unit coil 32 is fastened to the tooth 31b. Note that, when the coil fastening part 33 is turned inside the gap G, the axis of rotation R of the coil fastening part 33 can be maintained in a state made generally vertical to the height direction of the gap G (that is, can be maintained in a state made generally parallel to the end face 31b1 of the teeth 31b). In the example of FIG. 8, the axis of rotation R of the coil fastening part 33 is maintained in a state vertical to both the height direction of the gap G (direction of arrow A2) and width direction (left-right direction of FIG. 8).

Note that, in the present embodiment, a certain line segment being "aligned" with a certain direction means that the line segment is oriented so that the angle of that line segment with that direction approaches zero. Therefore, the first line segment L1 which is aligned with the height direction of the gap G as shown in FIG. 7 does not necessarily have to be made parallel to the height direction of the gap G. Similarly, the second line segment L2 which is aligned with the height direction of the gap G as shown in FIG. 8 does not necessarily have to be made parallel to the height direction of the gap G.

As explained above, the coil fastening part 33 in the stator 3 of the present embodiment is turned in the gap G about its axis of rotation R, whereby it can be moved between a first position where the first line segment L1 is aligned with the height direction of the gap G (see FIG. 7) and a second position where the second line segment L2 is aligned with the height direction of the gap G (see FIG. 8). Further, if the coil fastening part 33 is moved from the first position to the second position, the coil fastening part 33 pushes against the end face 31b1 of the tooth 31b and the inner circumferential surface 32a of the unit coil 32 to fasten the unit coil 32 to the tooth 31b. Note that, the axis of rotation R of the coil fastening part 33 can be positioned in any way so as to enable the coil fastening part 33 to be turned in the gap G and moved from the first position to the second position. In the example of FIG. 7 and FIG. 8, the axis of rotation R of the coil fastening part 33 is positioned at the center part both in the height and width directions of the gap G (direction of arrow A2 and left-right direction of FIG. 7 and FIG. 8).

The coil fastening part 33 in the stator 3 of the present embodiment can be formed from an elastically deformable material. In this case, the coil fastening part 33 receives pressure from the inner circumferential surface 32a of the unit coil 32 and the end face 31b1 of the tooth 31b and can be turned while elastically deforming. As a result, the turned coil fastening part 33 pushes against the end face 31b1 of the tooth 31b and the inner circumferential surface 32a of the unit coil 32 due to the elastic recovery force, so the unit coil 32 is stably fastened to the tooth 31b. On the other hand, instead of the coil fastening part 33 or in addition to the coil fastening part 33, the unit coil 32 may be formed to be able to elastically deform. Alternatively, an elastically deformable spacer may also be inserted instead of the coil fastening part in one of the two gaps G which are positioned on the both sides of the tooth 31b in the direction of extension. In these aspects as well, any of the coil fastening part 33, unit coil 32, and spacer generates an elastic recovery force, so the unit coil 32 can be stably fastened to the tooth 31b.

Figure 9:
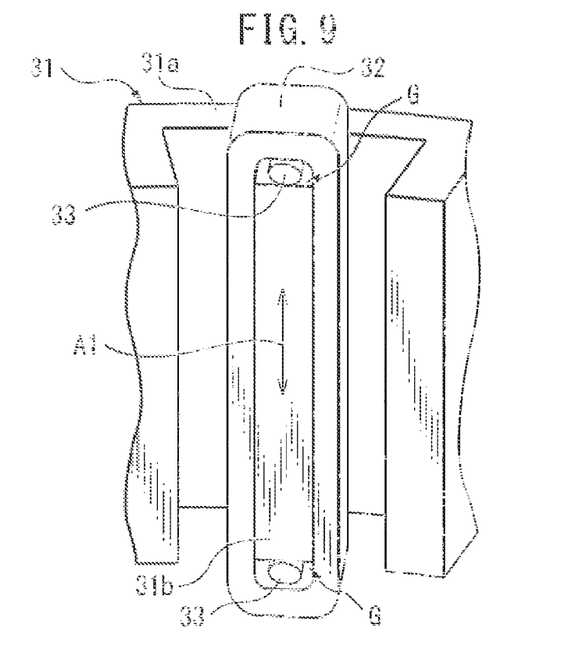
FIG. 9 is a perspective view for explaining a fastening method of a unit coil which uses a coil fastening part in a stator of a first embodiment.

After this, referring to FIG. 9 and FIG. 10, the fastening method for fastening a unit coil 32 by a coil fastening part 33 in the stator 3 of the present embodiment will be explained. As shown in FIG. 9, first the unit coil 32 is attached to a tooth 31b of the laminated core 31. As a result, gaps G are formed on the both sides of the tooth 31b in the direction of extension (direction of arrows A1). Next, the coil fastening part 33 is inserted into each of the gaps G. At this time, the coil fastening part 33 is inserted into the gap G so that the first line segment L1 in the cross-section vertical to the axis of rotation R is aligned with the height direction of the gap G (see FIG. 7). Note that, the coil fastening part 33 can be inserted into the gap G so that one of its end parts sticks out from the gap G. In this case, an operator can grasp the projecting portion of the coil fastening part 33, so the coil fastening part 33 can be easily turned in the gap G. Note that, the same coil fastening parts 33 may be inserted into the gaps G which are positioned on the both sides of the tooth 31b or coil fastening parts 33 with different shapes, dimensions, or materials may be inserted. Alternatively, in either of the gaps G, instead of a coil fastening part 33, any spacer which has flexibility or rigidity may be inserted.

Figure 10:
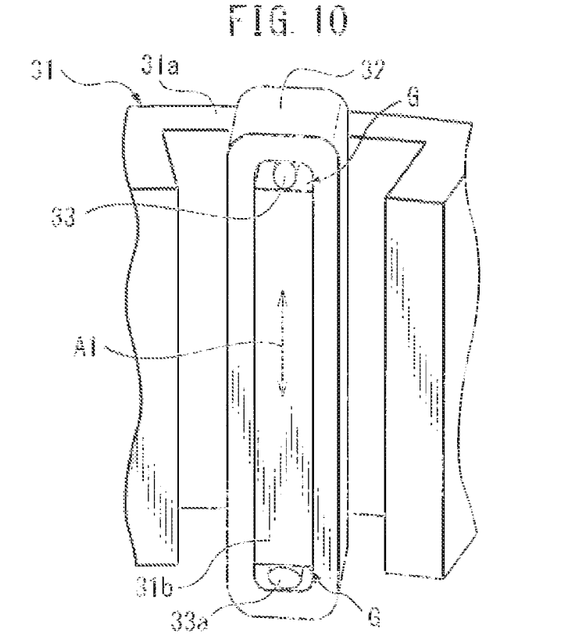
FIG. 10 is a perspective view for explaining a fastening method of a unit coil which uses a coil fastening part in a stator of a first embodiment.

As shown in FIG. 10, next, a coil fastening part 33 is turned in the gap G. At this time, coil fastening part 33 is turned in the gap G about its axis of rotation R so that the second line segment L2 at the cross-section vertical to its axis of rotation R is aligned with the height direction of the gap G (see FIG. 8). FIG. 10 shows the state where only the coil fastening part 33 in one gap G is turned. Next, if the coil fastening part 33 in the other gap G is similarly turned, the respective coil fastening parts 33 contact the inner circumferential surfaces of the unit coils 32 and the end faces of the tooth 31b in the gaps G. Due to this, the unit coils 32 are fastened to the tooth 31b. Note that, a coil fastening part 33 can be turned in a gap G by any technique. For example, the projecting portion at the end part of a coil fastening part 33 which sticks out from the gap G can be gripped by an operator and the coil fastening part 33 can be manually turned by the operator. In the above way, in the present embodiment, a coil fastening part 33 is turned in the gap G about its axis of rotation R, whereby the unit coil 32 is easily fastened to the tooth 31b, so the workability when fastening the unit coil 32 to the tooth 31b is improved.

Next, referring to FIG. 11 to FIG. 13, a second embodiment of the present invention will be explained. The stator of the present embodiment is configured similar to the stator of the above-mentioned first embodiment except for the part explained specifically below. Therefore, parts which are configured in the same way as the first embodiment are assigned the same reference notations as in the first embodiment and detailed explanations of the parts which have similar configurations are omitted.

Figure 11:
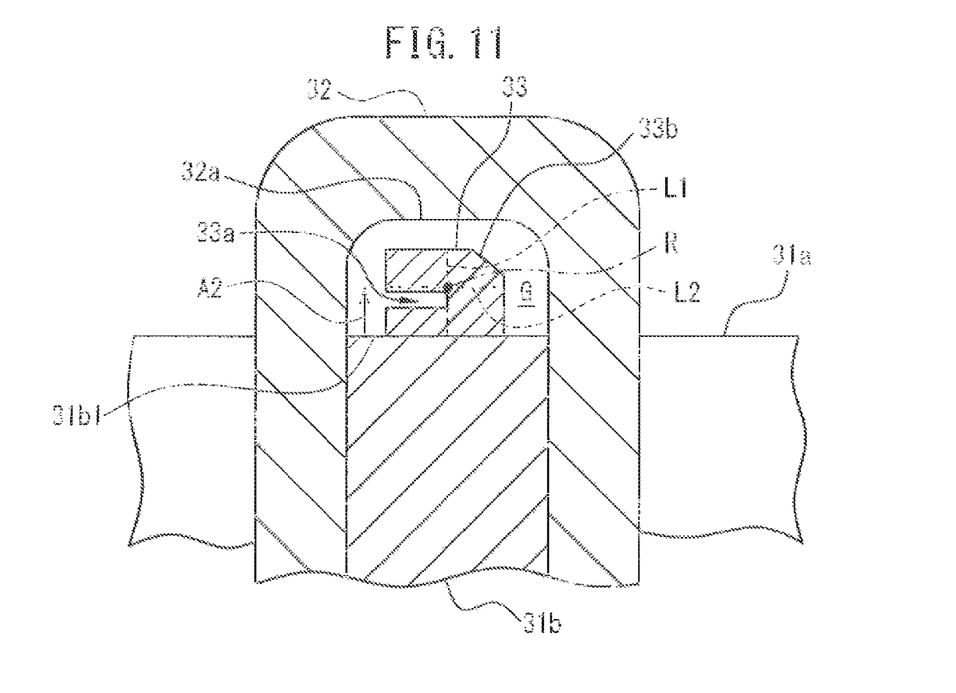
FIG. 11 is a cross-sectional view which shows the vicinity of a coil fastening part before turning in a stator in a second embodiment of the present invention.
Figure 12:
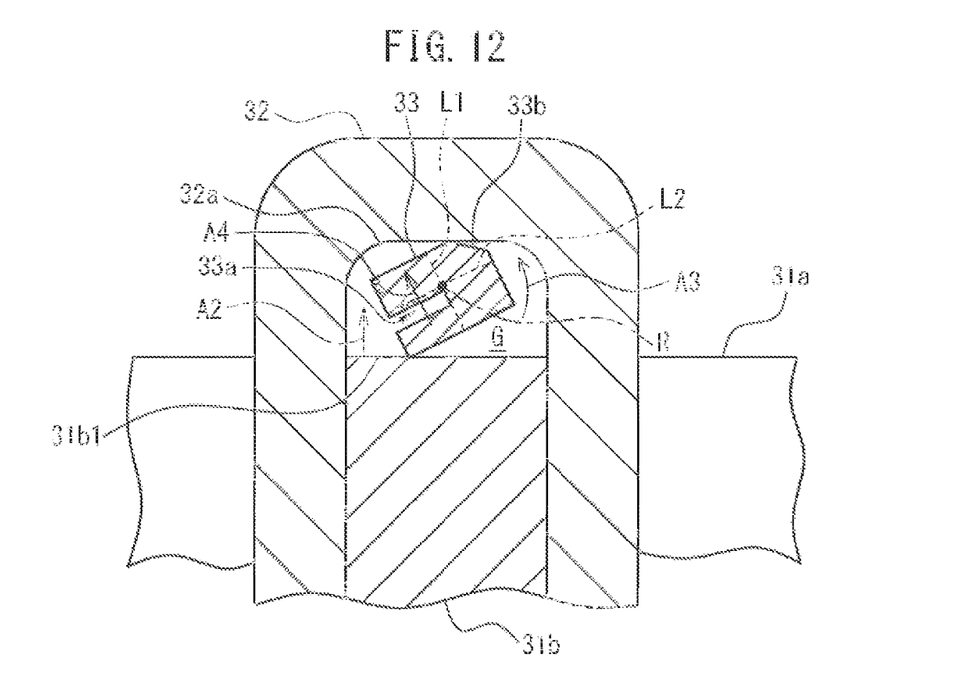
FIG. 12 is a cross-sectional view which shows the vicinity of a coil fastening part in the middle of turning in a stator in a second embodiment.
Figure 13:
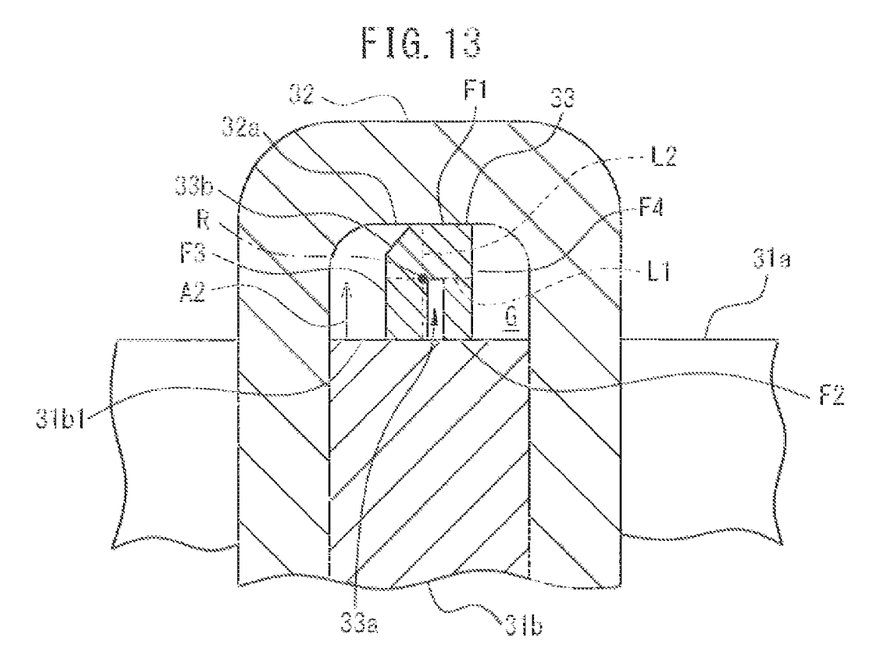
FIG. 13 is a cross-sectional view which shows a coil fastening part after turning in a stator in the second embodiment.

FIG. 11 to FIG. 13 are cross-sectional views which show the vicinity of a coil fastening part 33 as seen along the plane vertical to the projecting direction of a tooth 31b in the stator 3 of the present embodiment. FIG. 11 shows the state before the coil fastening part 33 is turned about its axis of rotation R, while FIG. 12 shows the state in the middle of the coil fastening part 33 being turned about its axis of rotation R. Further, FIG. 13 shows the state after the coil fastening part 33 has been turned about its axis of rotation. As shown in FIG. 11 to FIG. 13, the coil fastening part 33 in the stator 3 of the present embodiment has a recessed cutaway part 33a which is formed at the outer circumferential surface of the coil fastening part 33 so as to extend along its axis of rotation R. Therefore, the coil fastening part 33 in the stator 3 of the present embodiment has a C-shaped cross-sectional shape as a whole.

Due to such a structure, the coil fastening part 33 can easily elastically deform around the recessed cutaway part 33a, so the coil fastening part 33 can be easily turned inside the gap G. More specifically, in the example of FIG. 12, the coil fastening part 33 being turned receives compressive force from the end face 31b1 of the tooth 31b and easily elastically deforms in the direction of the arrow A4, so the coil fastening part 33 can be easily turned in the gap G. Therefore, even if the coil fastening part 33 being turned receives a large resistance force due to interference with the end face 31b1 of the tooth 31b or inner circumferential surface 32a of the unit coil 32, the coil fastening part 33 elastically deforms around the recessed cutaway part 33a whereby the coil fastening part 33 can easily be turned in the gap G.

In the present embodiment, the recessed cutaway part 33a is preferably formed at the surface of the coil fastening part 33 which contacts the end face 31b1 of the tooth 31b or the inner circumferential surface 32a of the unit coil 32 after the coil fastening part 33 is turned, that is, while the coil fastening part 33 fastens the unit coil 32. In the example of FIG. 13, the recessed cutaway part 33a is formed at the surface F2 of the coil fastening part 33 where it contacts the end face 31b1 of the tooth 31b among the side surfaces F1 and F2 vertical to the second line segment L2. However, the recessed cutaway part 33a according to the present example may also be formed at the surface F1 of the outer circumferential surface of the coil fastening part 33 where it contacts the inner circumferential surface 32a of the unit coil 32.

On the other hand, when the recessed cutaway part 33a is formed at a location different from the above contact surface on the outer circumferential surface of the coil fastening part 33, for example, the side surface F3 or side surface F4 vertical to the first line segment L1, the coil fastening part 33 easily elastically deforms in the height direction of the gap G (direction of arrow A2 of FIG. 13) after being turned, i.e., while fastening the unit coil 32, so the pushing force which acts from the coil fastening part 33 on the tooth 31b and unit coil 32 can fall. As a result, the unit coil 32 which is fastened by the coil fastening part 33 can become unstable.

Due to the above reason, the recessed cutaway part 33a is preferably formed at the surface of the coil fastening part 33 which contacts the end face 31b1 of the tooth 31b or the inner circumferential surface 32a of the unit coil 32 after the coil fastening part 33 is turned, that is, while the coil fastening part 33 fastens the unit coil 32. Due to this, it is possible to prevent the recessed cutaway part 33a from causing the unit coil 32 which is fastened by the coil fastening part 33 to become unstable.

Note that, when the coil fastening part 33 has a rectangular shape cross-section such as in FIG. 11 to FIG. 13, the coil fastening part 33 preferably has a chamfered part 33b which is formed so as to extend along its axis of rotation R. Due to such a chamfered part 33b, the frictional resistance when the coil fastening part 33 is turned in the gap G is reduced, so the coil fastening part 33 can be easily turned in the gap G.

The fastening method of a unit coil 32 in the stator 3 of the present embodiment is similar to the fastening method of a unit coil 32 in the stator 3 of the above-mentioned first embodiment. However, in the present embodiment, the coil fastening part 33 easily elastically deforms around the recessed cutaway part 33a, so the coil fastening part 33 can be easily turned in the gap G.

Next, referring to FIG. 14 to FIG. 16, a third embodiment of the present invention will be explained. The stator of the present embodiment is configured similar to the stator of the above-mentioned first embodiment except for the parts which are specifically explained below. Therefore, parts which have similar configurations as the first embodiment are assigned the same reference notations. Detailed explanations of these parts which have similar configurations will be omitted.

Figure 14:
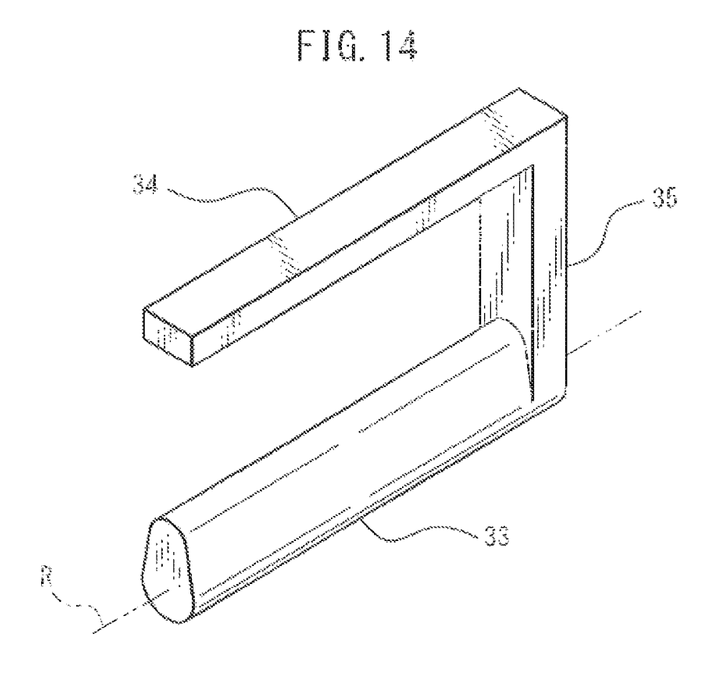
FIG. 14 is a perspective view which shows a coil fastening method of a stator of a third embodiment of the present invention.

FIG. 14 is a perspective view which shows a coil fastening part 33 in a stator 3 of the present embodiment. As shown in FIG. 14, in the present embodiment, a cable support part 34 which supports the above-mentioned electrical cables is connected to the coil fastening part 33. More specifically, in the example of FIG. 14, the coil fastening part 33 which extends along its axis of rotation R and the cable support part 34 which extends generally in parallel to the coil fastening part 33 are connected with each other by a connecting part 35 which extends substantially vertical to the two parts. In this way, in the present embodiment, a single part comprised of the coil fastening part 33 plus the cable support part 34 and connecting part 35 is formed. For example, the coil fastening part 33, cable support part 34, and connecting part 35 can be formed as an integrally molded article.

Figure 15:
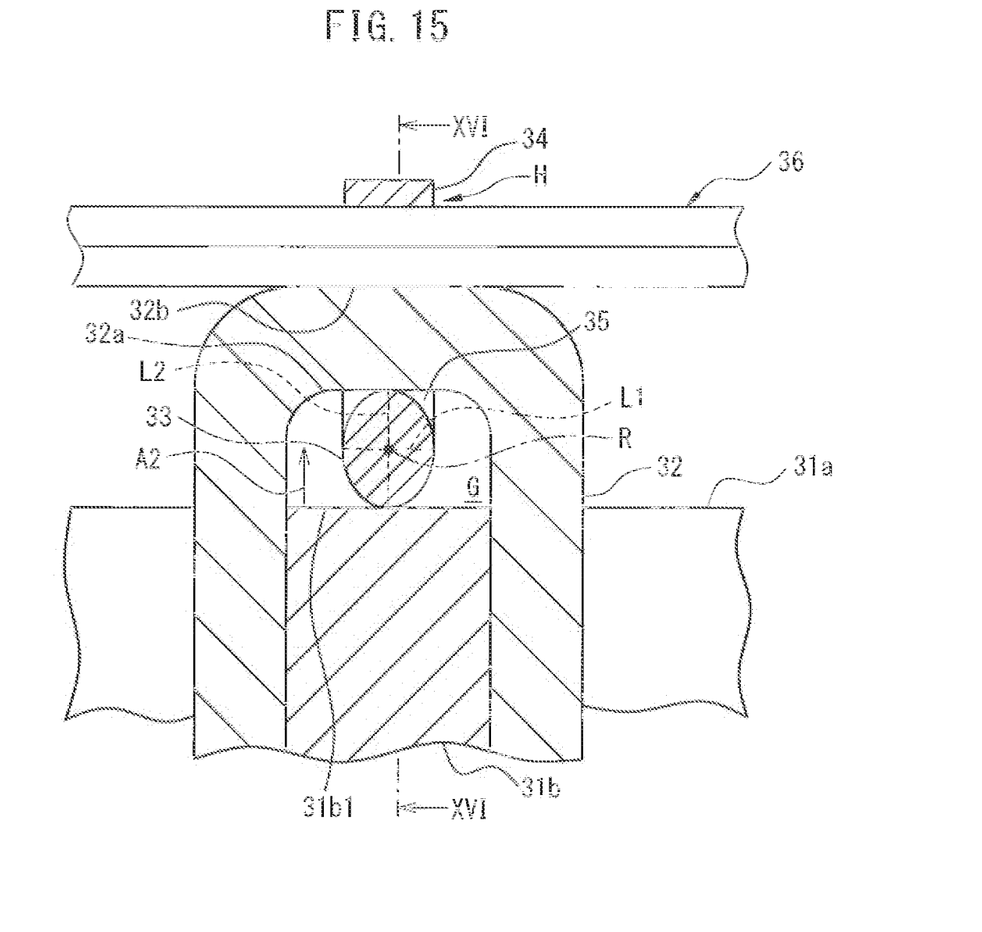
FIG. 15 is a cross-sectional view which shows the vicinity of a coil fastening part after turning in a stator in the third embodiment.
Figure 16:
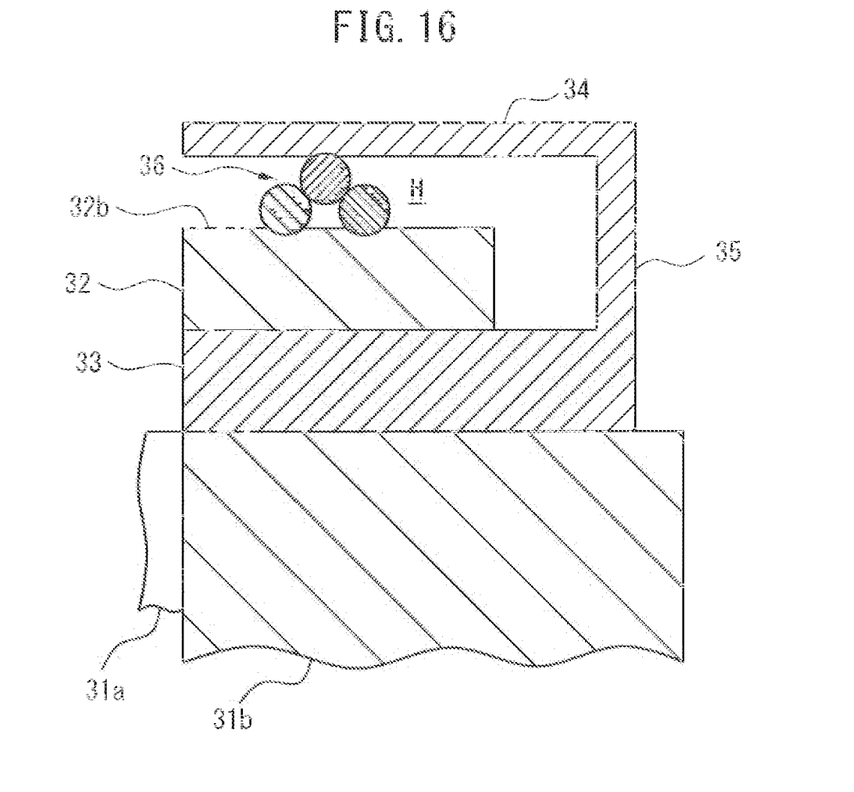
FIG. 16 is a cross-sectional view along the line XVI-XVI of FIG. 15.

FIG. 15 is a cross-sectional view which shows the vicinity of a coil fastening part 33 as seen along a plane vertical to the direction of projection of a tooth 31*b* in the stator 3 of the present embodiment. In the same way as the above-explained FIG. 8, this shows the state after the coil fastening part 33 is turned in the gap G about its axis of rotation R. Further, FIG. 16 is a cross-sectional view along the line XVI-XVI in FIG. 15. As will be understood from FIG. 15 and FIG. 16, in the present embodiment, when the coil fastening part 33 is turned in the gap G about its axis of rotation R and the unit coil 32 is fastened to the tooth 31*b*, the holding space H which holds the electrical cables 36 is formed between the cable support part 34 and the outer circumferential surface 32*b* of the unit coil 32. Therefore, according to the present embodiment, fastening of the unit coil 32 to a tooth 31*b* and support of the electrical cables 36 to the unit coil 32 can be achieved by a single part. As a result, the number of components of the stator 3 is reduced, so the workability in the process of manufacture of the stator 3 can be improved and the overall manufacturing cost of the stator 3 can be cut.

The fastening method of a unit coil 32 in the stator 3 of the present embodiment is similar to the fastening method of a unit coil 32 in the stator 3 of the above-mentioned first embodiment. However, in the fastening method of the present embodiment, the coil fastening part 33 is turned in the gap G about its axis of rotation R, the unit coil 32 is fastened to the tooth 31*b*, then the electrical cables 36 are held in the holding space H between the cable support part 34 and outer circumferential surface 32*b* of the unit coil 32. Due to this, fastening of the unit coil 32 in a stator 3 and support of the electrical cables 36 in the stator 3 can be achieved by a single part which has a coil fastening part 33 and cable support part 34.

Effect of Invention

According to the first, sixth, and seventh aspects of the invention, the coil fastening part is turned inside the gap so that the unit coil is easily fastened to a tooth, so the workability when fastening a unit coil to a tooth can be improved.

According to the second aspect of the invention, the coil fastening part generates a pushing force due to its elastic recovery force, so the unit coil can be stably fastened to a tooth.

According to the third aspect of the invention, the coil fastening part easily elastically deforms around the recessed cutaway part, so the coil fastening part can be easily turned inside the gap.

According to the fourth aspect of the invention, it is possible to prevent a recessed cutaway part from causing the unit coil which is fastened by the coil fastening part to become unstable.

According to the fifth aspect of the invention, the number of the components of the stator is reduced, so the workability in the process of production of the stator can be improved and the overall cost of production of the stator can be cut.

The present invention is not limited to only the above embodiments and can be modified in various ways within the scope of the claims. For example, in the above embodiments, a rotary type electric motor in which an mover which is arranged at the inside of a ring shaped stator engages in rotary motion is illustrated, but the electric motor which is provided with the stator of the present invention may also be a linear motor where the mover engages in linear motion along the stator which extends linearly. Further, the dimensions, shapes, materials, etc. of the members are only examples. Various dimensions, shapes, materials, etc. may be employed for achieving the advantageous effects of the present invention.

What is claimed is:

1. A stator of an electric motor which is provided with a tooth, a unit coil which is attached to said tooth so as to surround an outer circumferential surface of said tooth, and a coil fastening part which is arranged in a gap between an end face at the outer circumferential surface of said tooth and an inner circumferential surface of said unit coil, wherein
said coil fastening part can be turned inside said gap about its axis of rotation and has a noncircular shape cross-section which is vertical to said axis of rotation,
said coil fastening part has a cross-section with a first dimension which is represented by a first line segment which intersects said axis of rotation and a second dimension which is represented by a second line segment which intersects said axis of rotation and is different from said first line segment and which is larger than said first dimension,
said coil fastening part can be turned about said axis of rotation so as to move between a first position at which said first line segment is aligned with a height direction of said gap vertical to said end face of said tooth and a second position at which said second line segment is aligned with a height direction of said gap, and
said coil fastening part pushes against said end face of said tooth and said inner circumferential surface of said unit coil at said second position whereby said unit coil is fastened to said tooth.

2. The stator of an electric motor according to claim 1 wherein said coil fastening part utilizes an elastic restoring force so as to push against said end face of said tooth and said inner circumferential surface of said unit coil.

3. The stator of an electric motor according to claim 1 wherein said coil fastening part further has a recessed cutaway part which is formed to extend in parallel with said axis of rotation.

4. The stator of an electric motor according to claim 3 wherein said recessed cutaway part is formed at a contact surface of said coil fastening part with said end face of said tooth or with an inner circumferential surface of said unit coil.

5. The stator of an electric motor according to claim 1 wherein
said stator is further provided with a cable which supplies power to said unit coil,
a cable support part which extends along the outer circumferential surface of said unit coil and supports said cable is connected to said coil fastening part, and
a space which holds said cable is formed between said cable support part and the outer circumferential surface of said unit coil.

6. An electric motor which is provided with a stator according to claim 1.

7. A fastening method which fastens a unit coil in a stator of an electric motor, wherein said stator is provided with a tooth and a unit coil which is attached to said tooth so as to surround an outer circumferential surface of said tooth, a gap is formed between an end face at the outer circumferential surface of said tooth and an inner circumferential surface of said unit coil, said fastening method includes preparing a coil fastening part which can be turned inside said gap about its axis of rotation and has a noncircular shape cross-section which is vertical to said axis of rotation, said coil fastening part has a cross-section with a first dimension which is represented by a first line segment which intersects said axis of rotation and a second dimension which is represented by a second line segment which intersects said axis of rotation and is different from said first line segment and which is larger than said first dimension, said fastening method further includes inserting said coil fastening part in said gap so that said first line segment is aligned with a height direction of said gap vertical to said end face, and then turning said coil fastening part about said axis of rotation so that said second line segment is aligned with a height direction of said gap, and said coil fastening part which is turned about said axis of rotation pushes against both said end face of said tooth and said inner circumferential surface of said unit coil whereby said unit coil is fastened to said tooth.

* * * * *